US010033265B2

(12) United States Patent
Sugawara

(10) Patent No.: US 10,033,265 B2
(45) Date of Patent: Jul. 24, 2018

(54) SWITCHING POWER SUPPLY

(71) Applicant: Fuji Electric Co., Ltd., Kanagawa (JP)

(72) Inventor: Takato Sugawara, Nagano (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 38 days.

(21) Appl. No.: 15/205,848

(22) Filed: Jul. 8, 2016

(65) Prior Publication Data
US 2017/0019030 A1 Jan. 19, 2017

(30) Foreign Application Priority Data

Jul. 17, 2015 (JP) ................................. 2015-142602

(51) Int. Cl.
| | |
|---|---|
| *H02M 1/42* | (2007.01) |
| *H02M 1/00* | (2006.01) |
| *H02M 3/156* | (2006.01) |
| *H02M 1/08* | (2006.01) |

(52) U.S. Cl.
CPC .......... *H02M 1/4225* (2013.01); *H02M 1/083* (2013.01); *H02M 3/156* (2013.01); *H02M 2001/0009* (2013.01); *H02M 2001/0022* (2013.01); *H02M 2001/0025* (2013.01); *H02M 2001/0064* (2013.01); *Y02B 70/126* (2013.01)

(58) Field of Classification Search
CPC ........ H02M 1/12; H02M 1/42; H02M 1/4225; H02M 1/4233; H02M 1/4241; H02M 1/4258; H02M 1/428; H02M 1/4208; H02M 2001/4283; H02M 2001/4291
USPC .......................... 323/205, 207, 222, 263, 289
See application file for complete search history.

(56) References Cited

U.S. PATENT DOCUMENTS

| | | | |
|---|---|---|---|
| 6,984,963 B2 | 1/2006 | Pidutti et al. | |
| 7,116,090 B1 | 10/2006 | Yang et al. | |
| 9,143,035 B2 | 9/2015 | Chen | |
| 2013/0307497 A1* | 11/2013 | Chen ................... | H02M 3/1563 323/235 |
| 2014/0085949 A1* | 3/2014 | Sugawara ........... | H02M 1/4225 363/89 |

FOREIGN PATENT DOCUMENTS

JP 2013-243798 A 12/2013

* cited by examiner

*Primary Examiner* — Timothy J Dole
*Assistant Examiner* — Bryan R Perez
(74) *Attorney, Agent, or Firm* — Chen Yoshimura LLP

(57) ABSTRACT

The switching element is turned ON and OFF according to when the current flowing through the inductance element becomes equal to zero and according to an amplified error voltage between the output voltage and a target output voltage. More particularly, the OFF time of the switching element is calculated, and when the OFF time is less than a prescribed value, the ON time of the switching element is increased. Moreover, the amount by which the ON time of the switching element is increased is reduced if the error voltage if greater than a prescribed value.

12 Claims, 5 Drawing Sheets

SWITCHING POWER SUPPLY

BACKGROUND OF THE INVENTION

Technical Field

The present invention relates to a switching power supply that maintains a high power factor when a high voltage is input and also maintains stable operation when a low voltage is input.

Background Art

One type of switching power supply is a step-up chopper-type power factor correction (PFC) converter, in which an inductance element is used to create an input current proportional to an input voltage while generating a stable DC output voltage. This type of device offers a number of advantages, such as being small in size, having a high efficiency, and being low in cost.

This type of switching power supply typically includes an inductance element that is connected to an AC input power source via a rectifier circuit and a switching element that, when switched ON, forms a current path to the AC input power source via the inductance element. This type of switching power supply also typically includes a voltage output circuit that rectifies and smooths the current produced by the inductance element when the switching element is switched OFF in order to produce an output voltage as well as a control circuit that turns the switching element ON and OFF according to the voltage difference (error voltage) between the output voltage and a prescribed target output voltage.

The control circuit typically turns the switching element ON once the current flowing through the inductance element decreases to zero (zero-current switching). Once the switching element is switched ON, the current flowing through the inductance element increases at a rate that is proportional to an input voltage Vin from the rectifier circuit. This current (inductor current) continues to increase from zero for as long as the switching element remains ON. The control circuit then turns the switching element OFF when the fixed-slope ramp voltage triggered by turning the switching element ON exceeds the error voltage (voltage mode). Once the switching element is turned OFF, the polarity of the voltage applied to the inductance element inverts, and the current flowing through the inductance element starts to decrease as that current is output to the voltage output circuit via a diode. In this way, the current extracted from the inductance element is smoothed and the ON time of the switching element is controlled according to the error voltage in order to generate a stable prescribed output voltage Vout.

Once the inductor current decreases to zero, the switching element is turned back ON to start the next operation cycle, and the switching element continues to be turned ON and OFF as described above.

The input voltage Vin applied to the inductance element is a voltage waveform that continuously changes in magnitude over each half-cycle of the sine wave. However, when using the voltage mode described above to turn the switching element ON and OFF, the error voltage remains constant as long as the magnitude of the load remains constant, and therefore the on time Ton of the switching element also remains constant regardless of the phase of the input voltage Vin. Moreover, the voltage that is actually applied to the inductance element is less than the full input voltage due to the forward voltage drop of the rectifying element in the rectifier circuit and the voltage stored in an input capacitor connected to the output of the rectifier circuit. As a result, the difference between the input voltage and the voltage that is actually applied to the inductance element becomes relatively large at phase angles at which the instantaneous value of the input voltage Vin is low (low voltage phases). This reduces the current supplied to the inductance element, thereby causing the overall power factor to decrease.

Power factor refers to the value obtained by dividing the active input power (which is the product of the in-phase components of the input voltage and input current) of an AC circuit by the apparent power (which is the product of the root mean square values of the input voltage and input current). In other words, the active power is equal to the product of the apparent power and a coefficient (the power factor) that is determined by the load. Moreover, if due to load factors other than resistance the phase of the current lags behind the phase of the voltage, for example, the active power decreases by a corresponding amount. This causes the power factor to decrease, which means that the apparent power of the PFC switching power supply must be increased in order to maintain the same level of active power. A power factor correction circuit therefore matches the phases of the input voltage and the input current in order to increase the power factor.

Meanwhile, Patent Documents 1 and 2, for example, disclose increasing the ON time Ton of the switching element at phase angles at which the instantaneous value of the input voltage Vin is low (low voltage phases) to a value greater than that used at phase angles at which the instantaneous value of the input voltage Vin is high (high voltage phases) in order to increase the power factor and thereby combat the abovementioned decrease in power factor that otherwise occurs at the phase angles at which the instantaneous value of the input voltage Vin is low (the low voltage phases). Patent Document 1 discloses a scheme in which the phase of the input voltage Vin is obtained by detecting the peak value of the inductor current (which is proportional to the input voltage Vin) and the ON time Ton of the switching element is then adjusted accordingly. Patent Document 2 discloses a scheme in which the phase of the input voltage Vin is obtained by detecting the differential value of the inductor current (which is proportional to the input voltage Vin) and the ON time Ton of the switching element is then adjusted accordingly.

However, in both of the schemes disclosed in Patent Documents 1 and 2, a detection resistor for detecting the inductor current is connected to the current path that includes the inductance element, and the phase of the input voltage Vin is obtained by detecting the inductor current from the voltage drop that occurs across the detection resistor. The resistance of the detection resistor is determined by the characteristics (circuit constants) of the switching power supply such as the inductance L of the inductance element and the output voltage Vout, and the amount by which the ON time is corrected (adjusted) changes depending on this resistance value. Moreover, the current flowing through the inductance element decreases at phase angles at which the instantaneous value of the input voltage Vin is low. This decreases the precision with which the current can be detected using the detection resistor, which in turn makes it difficult to precisely detect the phase of the input voltage Vin. The magnitude of the inductor current itself also decreases proportionally to the input voltage Vin, which exacerbates the negative effects of noise while attempting to detect the current.

To solve this problem, Patent Document 3 discloses detecting the OFF time Toff of the switching element on the basis of the ON time Ton of the switching element and then increasing and correcting the ON time Ton according to the detected OFF time Toff. In other words, the technology disclosed in Patent Document 3 focuses on the fact that there is an approximately proportional relationship between the input voltage Vin and the OFF time Toff of the switching element at phase angles at which the instantaneous value of the input voltage Vin is low.

Here, the relationship between the ON time Ton and the OFF time Toff of the switching element, the input voltage Vi, and the output voltage Vo is given by Vi×Ton=(Vo−Vi)×Toff, or equivalently, Toff=Vi×Ton/(Vo−Vi). Patent Document 3 also discloses increasing the ON time Ton when the OFF time Toff is less than a prescribed value in order to prevent decreases in current in the low voltage phase regions and thereby prevent decreases in the overall power factor.

RELATED ART DOCUMENTS

Patent Documents

Patent Document 1: U.S. Pat. No. 6,984,963
Patent Document 2: U.S. Pat. No. 7,116,090
Patent Document 3: Japanese Patent Application Laid-Open Publication No. 2013-243798

SUMMARY OF THE INVENTION

However, in the technology disclosed in Patent Document 3, the ON time Ton of the switching element is force-increased when the OFF time Toff is too low. Therefore, during heavy loading states in which the input voltage Vin is low and the ON time Ton of the switching element is set to a relatively high value, the waveform of the current flowing through the inductance element may become significantly disrupted by any noise that enters the control circuit. More specifically, the control circuit will typically have a so-called zero-current detection (ZCD) terminal for detecting when the inductor current becomes equal to zero and then turning the switching element ON, for example. Any noise input to this ZCD terminal may therefore result in a zero-current state being erroneously detected before the inductor current actually becomes equal to zero.

When such a zero-current misdetection occurs, the switching element gets turned ON sooner than necessary, which results in an unexpectedly short OFF time Toff being detected. Therefore, because the technology is designed such that the ON time Ton is force-increased when the OFF time Toff is too low, the ON time Ton that gets set for the next operation cycle is larger than the correct ON time Ton.

Furthermore, as the ON time Ton of the switching element is increased, the peak value of the current flowing through the inductance element increases, and therefore a larger OFF time Toff will be detected in the next operation cycle. Once the OFF time increases, the feature for force-increasing the ON time Ton for the next operation cycle is no longer activated, and the ON time Ton of the switching element is not increased. This results in a so-called hunting phenomenon, in which after the ON time Ton of the switching element becomes longer than the correct ON time Ton, in the next operation cycle the ON time Ton of the switching element is shorter than the correct ON time as determined by the feature for force-increasing the ON time, and then the whole process is repeated again. This phenomenon of hunting back and forth for the correct ON time Ton disrupts the inductor current waveform. The switching power supply is particularly prone to this hunting phenomenon in the low voltage phase regions in which the root mean square value of the input voltage Vin is low (such as when the input voltage Vin is from a 100V system) and a heavy load is applied to the switching element. In other words, the switching power supply is particularly prone to this hunting phenomenon in the phase regions in which the OFF time Toff is set to the lowest values and the switching power supply is most prone to the effects of zero-current misdetections.

The present invention was made in light of the foregoing and aims to provide a switching power supply that makes it possible to maintain a high power factor when a high voltage system (such as a 220V system) is input and also makes it possible to maintain stable operation when a low voltage system (such as a 100V system) is input even during heavy loading states. Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in a first aspect, the present disclosure provides a switching power supply, including:

a switching element that, when turned ON, forms a current path between terminals of an input power source through an inductance element;

a voltage output circuit that, when the switching element is turned OFF, rectifies and smooths a current obtained from the inductance element in order to generate an output voltage;

an error amplifier that generates an error voltage representing a difference between the output voltage and a prescribed target output voltage;

a zero current detection circuit that determines that the current flowing through the inductance element has decreased to zero when the current flowing through the inductance element has decreased to less than a prescribed reference value;

a ramp voltage generation circuit that starts generating a ramp voltage each time the switching element is turned ON;

an ON/OFF control circuit that turns the switching element ON each time the zero current detection circuit detects zero current and subsequently turns the switching element OFF when the ramp voltage generated by the ramp voltage generation circuit exceeds the error voltage;

an OFF time detection circuit that monitors an OFF time of the switching element;

an ON time increasing circuit connected to the ramp voltage generation circuit, the ON time increasing circuit comparing the OFF time of the switching element as monitored by the OFF time detection circuit with a prescribed value and, when the OFF time of the switching element is less than the prescribed value, causing the ramp voltage generated by the ramp voltage generation circuit to change in such a way as to increase the ON time of the switching element; and an ON time increase reduction circuit that determines whether the input power source is a relatively low voltage system or a relatively high voltage system, and that reduces an amount by which the ON time of the switching element is increased by the ON time increasing circuit when the input power source is determined to be the relatively low voltage system.

More specifically, the ON time increasing circuit increases the ON time of the switching element by reducing a slope of the ramp voltage, for example. Moreover, the ON time increase reduction circuit reduces an amount by which a slope of the ramp voltage is decreased by the ON time increasing circuit, for example.

The ramp voltage generation circuit generates the ramp voltage by an integrator that integrates a first constant current and that is reset when the zero current detection circuit detects the zero current. Moreover, the ON time increasing circuit is a first current amplifier that generates a second constant current when a signal voltage that represents the OFF time of the switching element is less than a prescribed threshold value and reduces a slope of the ramp voltage by subtracting the second constant current from the first constant current that is integrated by the integrator. Furthermore, the ON time increase reduction circuit is a second current amplifier that decreases the second constant current by decreasing a gain of the first current amplifier when a voltage of the input power source is less than a prescribed voltage.

It is preferable that the ON time increase reduction circuit determines whether the input power source is the relatively low voltage system based upon a magnitude of the error voltage, which decreases when the input voltage is high and a light load is applied to the switching element and increases when the input voltage is low and a heavy load is applied to the switching element.

Here, the switching power supply may further include a full-wave rectifier circuit to be connected to an AC input power source of a prescribed voltage so that an input voltage that has been full-waved rectified is applied to one end of the inductance element. The inductance element, the switching element, and the voltage output circuit form a step-up inverter that generates a prescribed DC output voltage from the input voltage.

The switching power supply is configured such that the AC input power source of the prescribed voltage to which the full-wave rectifier circuit is to be connected is either a 100V or 220V commercial AC power source, for example. The ON time increase reduction circuit determines that the commercial AC power source is the 100V power source when the error voltage is greater than a prescribed value and decreases the second constant current output by the ON time increasing circuit.

Moreover, the OFF time detection circuit is reset when the switching element is turned OFF and then detects, as the OFF time of the switching element, a charge voltage of a capacitor charged by a constant current source until the switching element is turned back ON in a next cycle, and then that charge voltage is maintained while the switching element remains ON in that next cycle.

In the switching power supply configured as described above, the ON time increasing circuit force-increases the ON time Ton of the switching element when the OFF time Toff of the switching element is less than a prescribed value in phase angle regions in which the instantaneous value of the input voltage Vin is low (low voltage phase regions). This makes it possible to prevent the current supplied to the inductance element from decreasing in the low phase regions of the input voltage, thereby preventing decreases in the power factor.

Moreover, when the error voltage Verr is greater than a prescribed value (that is, when it is determined that the input voltage Vin is a low voltage system (such as 100V)), the ON time increase reduction circuit reduces the amount by which the ON time increasing circuit increases the ON time Ton of the switching element. This prevents the ON time Ton of the switching element from being force-increased by a large amount when the low input voltage Vin is a low voltage system, thereby reducing the occurrence of the abovementioned phenomenon of hunting for the correct ON time Ton. In other words, this prevents excessive increases of the ON time, thereby making it possible to maintain stable operation even when a low voltage system power source is used.

The switching power supply in at least one aspect of the present invention focuses primarily on the error voltage Verr, which is closely related to the magnitude of the root mean square value of the input voltage Vin, and the ON time increase reduction circuit is controlled according to this error voltage Verr. Moreover, this error voltage Verr is already used in conventional technologies as part of the control scheme for turning OFF the switching element in order to achieve a stable output voltage. Therefore, using the error voltage Verr to monitor the magnitude of the input voltage Vin as well does not result in any significant added complexity to the configuration of the switching power supply.

In particular, the ON time increasing circuit and the ON time increase reduction circuit can be easily integrated together with the main components of the control circuit, such as the ramp voltage generator (ramp generator) and the zero voltage detection circuit. Integrating together the components of the control circuit in this way makes it possible to sufficiently achieve the effects of the present invention simply by replacing an existing switching power supply control circuit such as the one disclosed in Patent Document 3, for example. This makes it possible to provide a stable switching power supply that can be used with a wide variety of input voltages ranging from 100V systems to 220V systems.

It is to be understood that both the foregoing general description and the following detailed description are exemplary and explanatory, and are intended to provide further explanation of the invention as claimed.

DETAILED DESCRIPTION OF EMBODIMENTS

Next, a switching power supply according to an embodiment of the present invention will be described with reference to figures.

Figure 1:
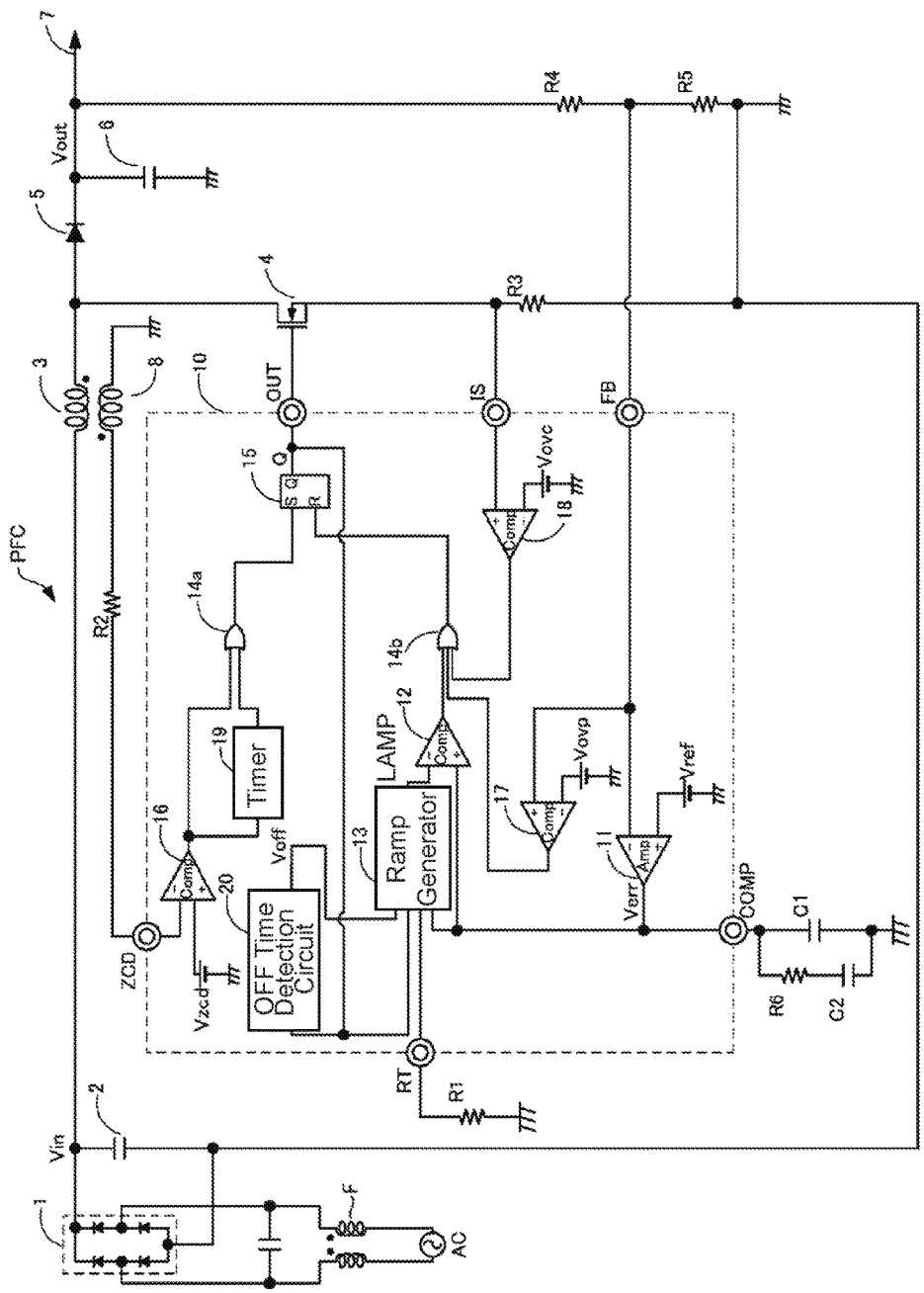
FIG. 1 schematically illustrates a configuration of a switching power supply according to an embodiment of the present invention.

FIG. 1 schematically illustrates a configuration of a switching power supply (power factor correction converter) PFC according to this embodiment of the present invention. As illustrated in FIG. 1, a rectifier circuit 1 rectifies an AC voltage applied from an input power source AC via an input filter F and inputs the rectified voltage to the switching power supply PFC. The input power source AC is a commercial AC power source of a 100V system or 220V system, and the rectifier circuit 1 is a diode bridge circuit, for example.

The switching power supply PFC includes an inductance element 3 that is connected to the rectifier circuit 1 and a switching element 4 that, when switched ON, forms a current path to the rectifier circuit 1 via the inductance element 3. The switching power supply PFC also includes a diode 5 that forms a current path between the inductance element 3 and an output capacitor 6 when the switching element 4 is switched OFF as well as a control circuit 10 that turns the switching element 4 ON and OFF to control the current flowing through the inductance element 3.

The switching power supply PFC also includes an input capacitor 2 that removes the high frequency components generated by the switching behavior of the switching element 4. Moreover, the diode 5 and the output capacitor 6 form a voltage output circuit that rectifies and smooths the current obtained from the inductance element 3 to generate a DC output voltage Vout. The control circuit 10 works to maintain this output voltage Vout at a value such as 400V, for example.

The switching element 4 is a MOSFET that, when switched ON, allows current to flow to and through the inductance element 3. This current increases at a rate that is proportional to the input voltage Vin applied to the switching power supply PFC. The current flowing through the inductance element 3 (inductor current) continues to increase from zero for as long as the switching element 4 remains ON. Once the switching element 4 is turned OFF, the polarity of the voltage applied to the inductance element 3 inverts, and the inductor current is supplied to the output capacitor 6 via the diode 5. Because the polarity of the voltage applied to the inductance element 3 is inverted, the inductor current continues to decrease as time elapses. The rate at which the inductor current decreases is substantially proportional to the difference between the output voltage and the input voltage (that is, to the output voltage minus the input voltage). Once the inductor current decreases to zero, the control circuit 10 turns the switching element 4 back ON to start the next operation cycle, and the process of generating the output voltage Vout via the inductance element 3 as described above is repeated.

The control circuit 10 determines the ON time Ton to use for the switching element 4 according to an error signal obtained by amplifying the difference between the output voltage Vout received at the output capacitor 6 and a prescribed target output voltage and turns the switching element 4 OFF accordingly (voltage mode). Moreover, the control circuit 10 turns the switching element 4 ON once it is detected that the inductor current has decreased to zero (zero-current switching).

More specifically, the control circuit 10 includes a zero voltage detection circuit 16 that detects when the inductor current flowing through the inductance element 3 has decreased to zero by using a voltage obtained from an auxiliary coil 8 of the inductance element 3 and input via a resistor R2 to a ZCD terminal. The zero voltage detection circuit 16 is a comparator that compares the voltage input to the ZCD terminal to a prescribed zero current detection voltage Vzcd. An OR circuit 14a takes the logical sum of a zero current detection signal output by the zero voltage detection circuit 16 and a signal output by a timer circuit 19 (which is produced by delaying the zero current detection signal), and the resulting signal is used to set an RS flip-flop 15 (described later). Setting the RS flip-flop 15 results in the switching element 4 being turned ON.

The control circuit 10 also includes an error amplifier 11 that compares the output voltage Vout which is divided and detected via resistors R4 and R5 and fed back into an FB terminal to a reference voltage Vref that defines the target output voltage in order to obtain an error voltage Verr. The error amplifier 11 is a so-called transconductance amplifier. In addition, a phase compensation circuit constituted by a capacitor C1, a resistor R6, and a capacitor C2 is connected to the output terminal of the error amplifier 11 via a COMP terminal. The phase compensation circuit removes any ripples in the error voltage Verr obtained from the error amplifier 11 in order to produce a smooth signal.

The control circuit 10 also includes a PWM comparator 12 that controls the ON time Ton of the switching element 4 by comparing the error voltage Verr (which is smoothed as described above) with a ramp voltage RAMP output by a ramp generator 13. The output of the PWM comparator 12 resets the RS flip-flop 15, thereby turning the switching element 4 OFF.

The control circuit 10 also includes a comparator 17 that compares the output voltage Vout as detected via the resistors R4 and R5 and input to the FB terminal to an overvoltage protection voltage Vovp in order to detect overvoltages. Furthermore, the control circuit 10 includes a comparator 18 that compares a current detection voltage that is produced by detecting the current flowing through the switching element 4 using a resistor R3 and then input to an IS terminal to an overcurrent protection voltage Vovc. The detection signals from the comparators 17 and 18 function as protection signals. When set to the H level, these protection signals prevent the switching element 4 from being turned ON. An OR circuit 14b takes the logical sum of these detection signals and the output of the PWM comparator 12, and the resulting signal is input to the reset terminal of the RS flip-flop 15. Resetting the RS flip-flop 15 results in the switching element 4 being turned OFF.

Therefore, the control circuit 10, which is configured as described above, includes an ON/OFF control circuit that turns the switching element 4 ON when a zero current is detected and turns the switching element 4 OFF when the ramp voltage RAMP exceeds the error voltage Verr. The ON/OFF control circuit in this embodiment includes the RS flip-flop 15 and the comparator 12. This way, the control circuit 10 repeatedly turns the switching element 4 ON and OFF such that a stable DC output voltage Vout is generated at the output capacitor (voltage output circuit) 6.

Figure 2:
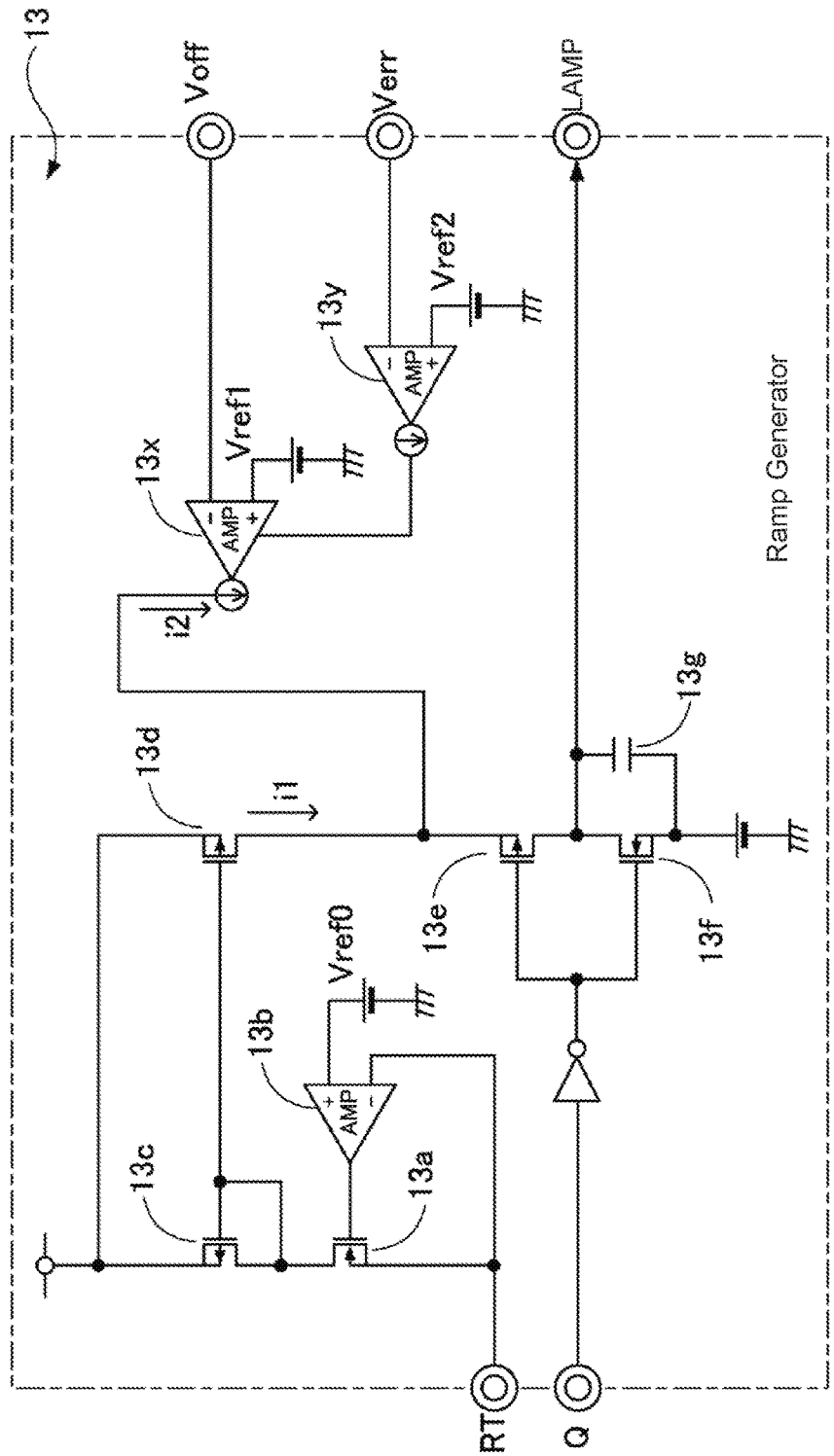
FIG. 2 illustrates an example configuration of a ramp generator for use in the switching power supply illustrated in FIG. 1.

The ramp generator 13 is configured as illustrated in FIG. 2, for example. The ramp generator 13 includes a constant current circuit that is constituted by: an operational amplifier (op-amp) 13b that sets a current that flows through an N-channel FET 13a according to the resistance of a resistor R1 that is connected to a terminal RT as illustrated in FIG. 1; and a pair of P-channel FETs 13c and 13d that form a current mirror circuit. This constant current circuit generates a first constant current i1 that is proportional to the current flowing through the FET 13a. Here, the current flowing through the FET 13a is given by Vref0/r1, where Vref0 is a constant voltage input to the non-inverting input terminal of the op-amp 13b and r1 is the resistance of the resistor R1 connected to the terminal RT.

The ramp generator 13 also includes: FETs 13e and 13f that are cascade-connected to the FET 13d and are turned ON and OFF exclusively according to the output Q of the RS flip-flop 15; and a capacitor 13g that is charged by the first constant current i1 supplied from the constant current circuit via the FET 13e and discharges that stored charge via the FET 13f. The capacitor 13g forms an integrator that integrates the first constant current i1.

In the ramp generator 13 which is configured as described above, the capacitor 13g starts integrating the first constant current i1 once the RS flip-flop 15 is set, thereby generating the ramp voltage RAMP which increases in magnitude at a fixed rate while the switching element 4 remains ON. Thus, these elements 13a through 13g constitute a ramp voltage generation circuit. In addition to the ramp voltage generation circuit, the ramp generator 13 also includes first and second current amplifiers 13x and 13y, which will be described in more detail later, in order to change the rate of the ramp voltage generated by the ramp voltage generation circuit (13a to 13g).

The switching power supply according to the present embodiment is characterized in that as illustrated in FIG. 1, the control circuit 10 includes an OFF time detection circuit 20, and as illustrated in FIG. 2, the ramp generator 13 includes the first and second current amplifiers 13x and 13y. The OFF time detection circuit 20 detects the OFF time Toff of the switching element 4 according to the output Q of the RS flip-flop 15 and generates an OFF time detection voltage Voff that represents the OFF time Toff.

Figure 3:
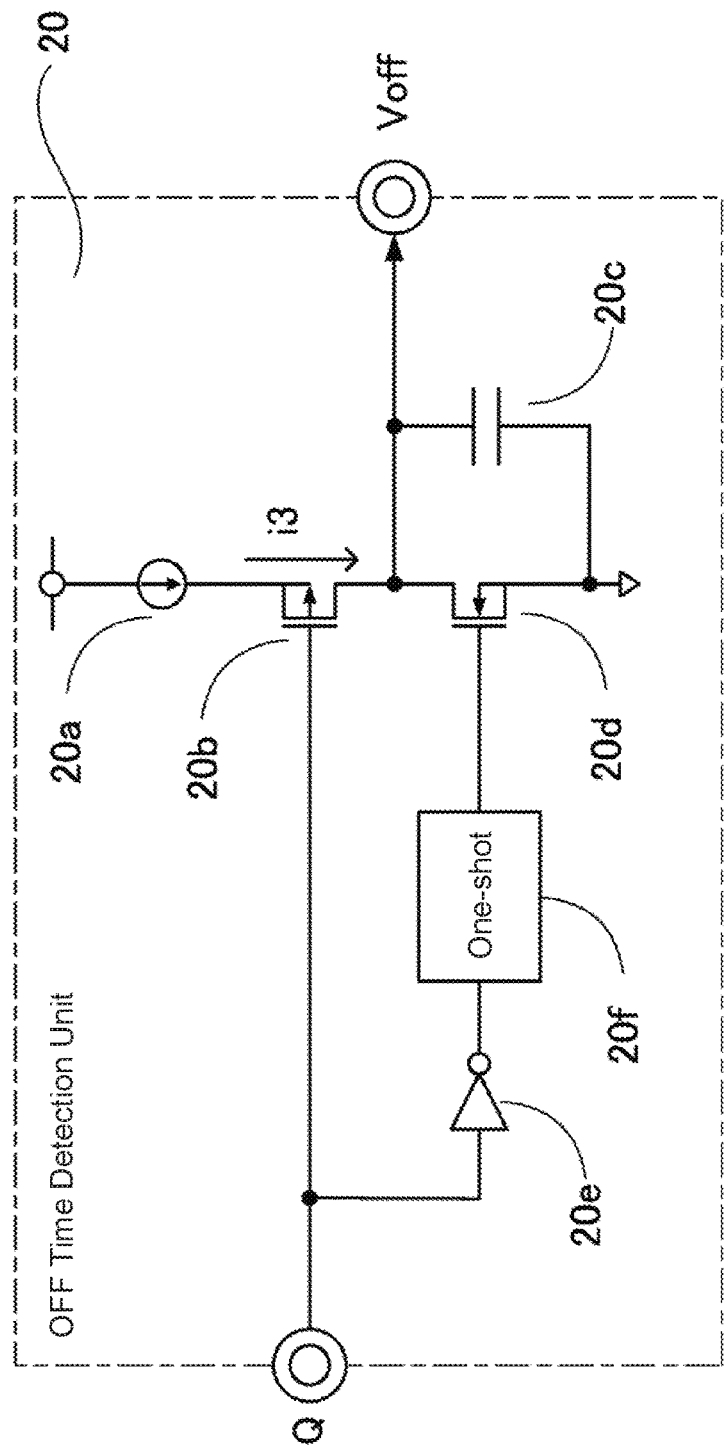
FIG. 3 illustrates an example configuration of an OFF time detection circuit for use in the switching power supply illustrated in FIG. 1.

As illustrated in FIG. 3, for example, the OFF time detection circuit 20 includes: a P-channel type first FET 20b that is connected to constant current source 20a and controls whether a capacitor 20c is charged by a constant current i3 output by the constant current source 20a; and an N-channel type second FET 20d that is connected in parallel to the capacitor 20c and instantaneously discharges any charge stored in the capacitor 20c. The first FET 20b is turned ON and OFF according to the output Q of the RS flip-flop 15. The second FET 20d is triggered by a signal produced by inverting the output Q of the RS flip-flop 15 using an inverting circuit 20e and is turned ON and OFF by the output of a one-shot circuit 20f, which outputs a pulse signal of approximately several dozen nanoseconds in duration, for example.

In the OFF time detection circuit 20 configured as described above, when the RS flip-flop 15 is reset and the output Q is set to low (L) (that is, when the switching element 4 is turned OFF), the first FET 20b is turned ON, and the output of the one-shot circuit 20f turns the second FET 20d ON for a period of approximately several dozen nanoseconds in duration. Turning the second FET 20d ON allows the capacitor 20c to discharge any stored charge, thereby setting the charge voltage of the capacitor 20c to zero.

Once the ON period of the second FET 20d ends after several dozen nanoseconds have elapsed, the first FET 20b remains ON for the rest of the time the RS flip-flop 15 remains in the reset state, and therefore the capacitor 20c is charged by the constant current i3. Then, when the RS flip-flop 15 is set and the switching element 4 is turned ON, the capacitor 20c stops being charged by the constant current i3. Therefore, the charge voltage of the capacitor 20c corresponds to the OFF time Toff of the switching element 4. The charge voltage of the capacitor 20c is then output as the OFF time detection voltage Voff, which represents the OFF time Toff of the switching element 4.

The first current amplifier 13x of the ramp generator 13 functions as an ON time increasing circuit that increases the ON time Ton of the switching element 4 when the OFF time detection circuit 20 detects that the OFF time Toff of the switching element 4 is less than a prescribed threshold value. In other words, the first current amplifier 13x that functions as the ON time increasing circuit force-increases the ON time Ton of the switching element 4 when the OFF time detection voltage Voff is less than a prescribed first threshold voltage Vref1 in order to prevent the power factor of the switching power supply from decreasing in the low voltage phase regions.

Figure 4:
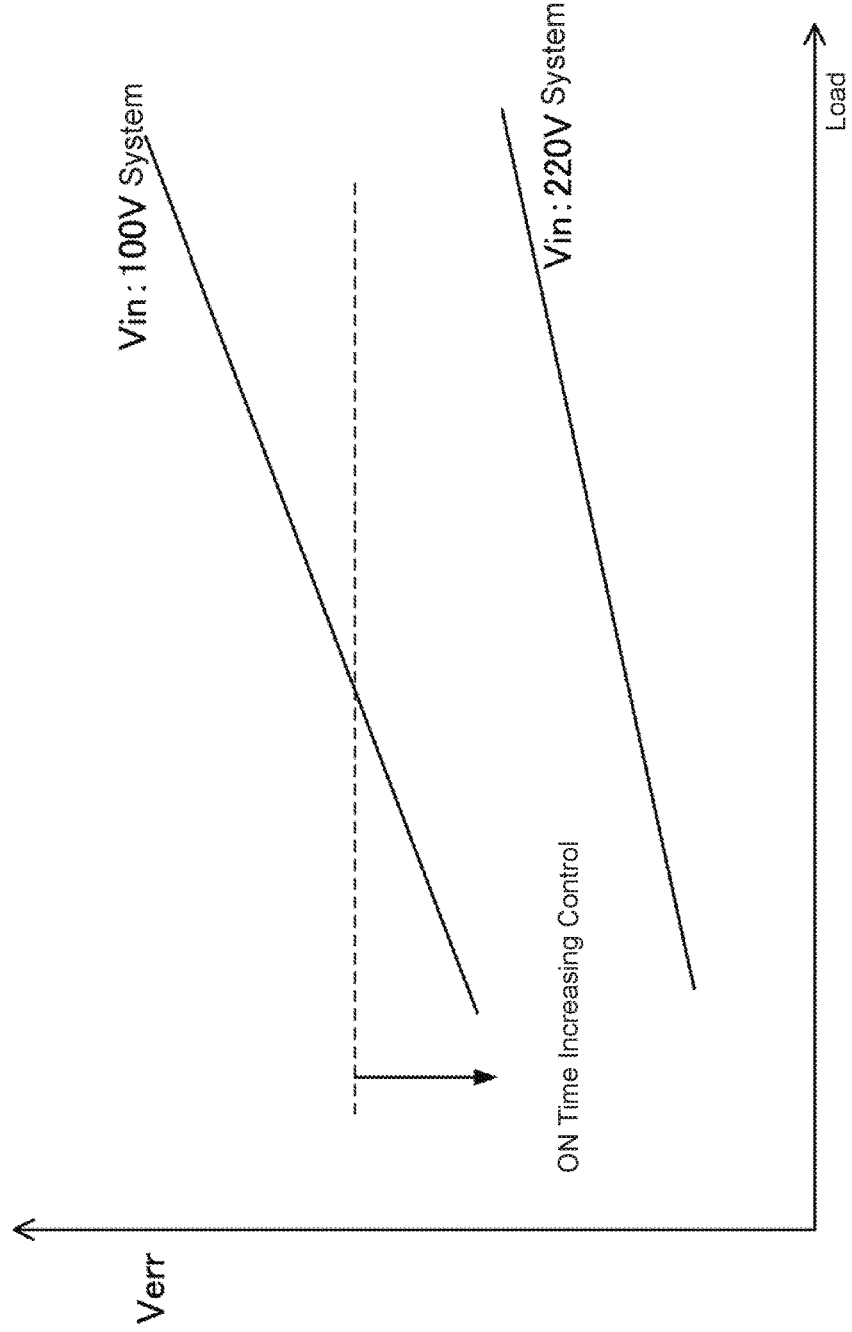
FIG. 4 is a graph showing the relationship between the magnitude of a load and the resulting error voltage Verr for an AC input power source of a 100V system and a 220V system.

Furthermore, the second current amplifier 13y of the ramp generator 13 uses the error voltage Verr to determine whether the input voltage Vin is a high voltage system obtained from a commercial AC power source of a 220V system or a low voltage system obtained from a commercial AC power source of a 100V system. More specifically, as illustrated in FIG. 4, for example, the magnitude of the error voltage Verr is significantly different depending on the input voltage Vin and also changes according to changes in the magnitude of the load. The second current amplifier 13y therefore compares the error voltage Verr to a prescribed determination threshold value to determine whether the input voltage Vin is a high voltage system or a low voltage system. The reason why the magnitude of the error voltage Verr is significantly different according to whether the input voltage Vin is a high voltage system or a low voltage system is described below.

The average value of the current supplied from the inductance element 3 to the load over a single switching cycle is given by Io/2, where Io is the peak value (maximum value) of the current flowing through the inductance element 3. This current of magnitude Io/2 is consumed as-is by the load and should therefore be the same for the same load at a given phase angle of the input voltage regardless of whether the input voltage is a high voltage system or a low voltage system. Meanwhile, the peak value Io of the current is given by Io=(Vin/L)×Ton, where L is the inductance of the inductance element 3 and Ton is the ON time of the switching element.

Here, Ton must be inversely proportional to Vin in order to achieve the same peak current Io from a high voltage system and a low voltage system. Moreover, as described above, the ON time Ton is the time that it takes the ramp voltage RAMP to increase from zero to the error voltage Verr. As a result, assuming steady-state operation of the switching power supply, the error voltage Verr will be smaller in magnitude when using the high input voltage Vin is a high voltage system, and the error voltage Verr will be greater in magnitude when the low input voltage Vin is a low voltage system.

Therefore, the second current amplifier 13y determines that the input voltage Vin is a low voltage system obtained from a commercial AC power source of a 100V system if the error voltage Verr is greater than a second threshold voltage Vref2. Furthermore, the second current amplifier 13y functions as an ON time increase reduction circuit that reduces the amount by which the ON time Ton of the switching element 4 is increased by the ON time increasing circuit when the input voltage Vin is a low voltage system.

Figure 5:
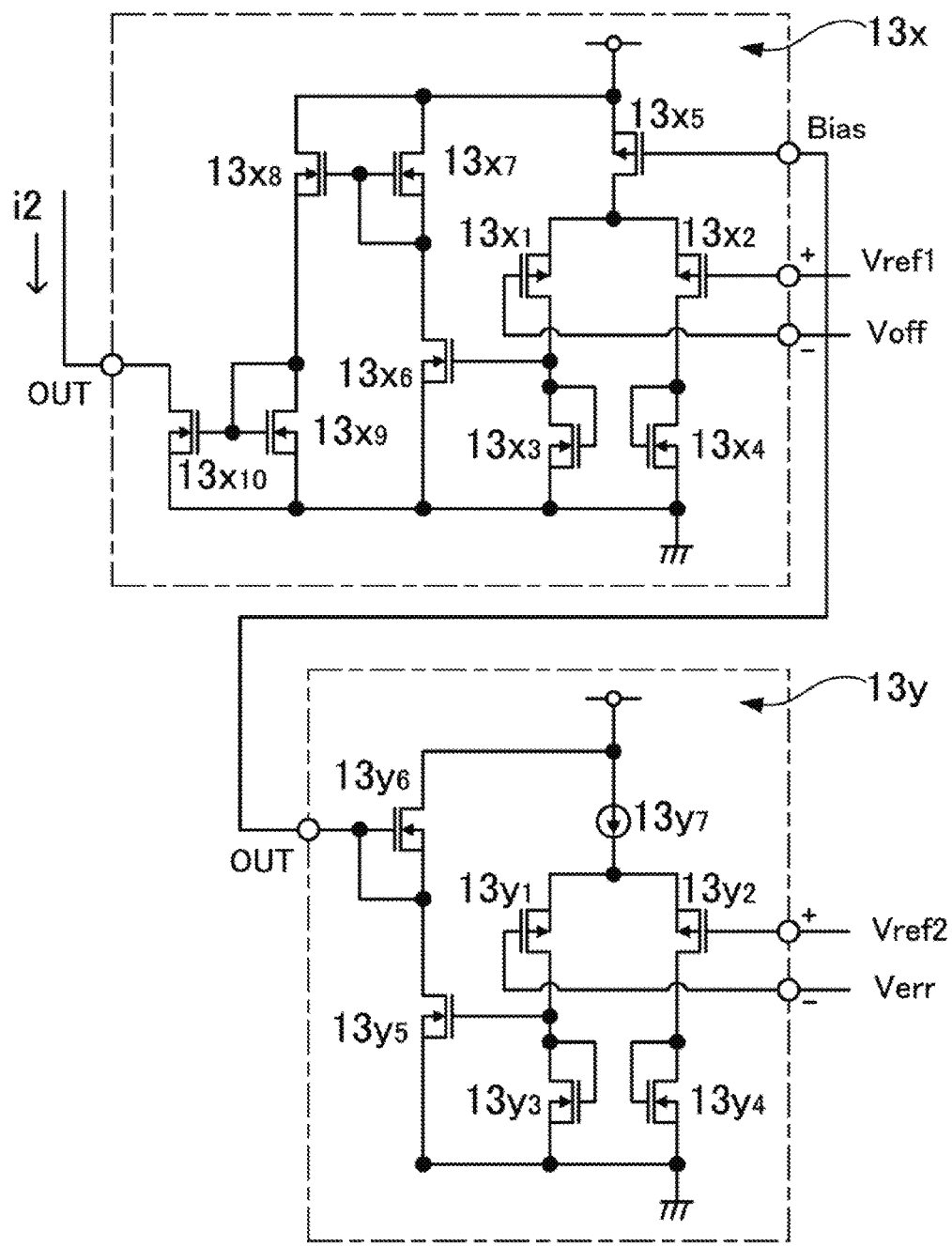
FIG. 5 illustrates an example configuration of a first current amplifier (an ON time increasing circuit) and a second current amplifier (an ON time increase reduction circuit) that are integrated into the ramp generator illustrated in FIG. 2.

More specifically, as illustrated in FIG. 5, for example, the first current amplifier (ON time increasing circuit) 13x includes a differential amplifier in which diode-connected N-channel FETs 13x3 and 13x4 function as loads and a pair of P-channel FETs 13x1 and 13x2 function as a differential pair. The OFF time detection voltage Voff and the threshold voltage Vref1 are respectively input to the gate terminals of the FETs 13x1 and 13x2. Furthermore, a P-channel FET 13x5 is connected to the source terminals of the FETs 13x1 and 13x2 and functions as a current source that supplies a bias current to the differential amplifier according to a bias voltage Bias applied to the gate terminal of the FET 13x5. In the differential amplifier, when the OFF time detection voltage Voff is equal to the first threshold voltage Vref1, half of the bias current is passed through to the P-channel FETs 13x1 and 13x2 and half of the bias current is passed through to the N-channel FETs 13x3 and 13x4.

When the OFF time detection voltage Voff is less than the first threshold voltage Vref1 (that is, Voff<Vref1), the N-channel FET 13x3 receives more current. Similarly, when the OFF time detection voltage Voff is greater than the first threshold voltage Vref1 (that is, Voff>Vref1), the N-channel FET 13x4 receives more current. Moreover, the difference between the currents flowing through the N-channel FETs 13x3 and 13x4 increases as the difference between the OFF time detection voltage Voff and the first threshold voltage Vref1 increases. Once the difference between the OFF time detection voltage Voff and the first threshold voltage Vref1 exceeds a prescribed value (which is approximately equal to the threshold voltage of the P-channel FETs 13x1 and 13x2), current begins to flow to just one of the N-channel FETs 13x3 and 13x4 (the FET for which the applied voltage (Voff or Vref1) is lowest).

Furthermore, an N-channel FET 13x6 is connected to the output stage of the differential amplifier. Together, the N-channel FET 13x6 and the N-channel FET 13x3 form a first current mirror circuit, and the amount of current that flows to the first current mirror circuit increases as the OFF time detection voltage Voff becomes increasingly less than the first threshold voltage Vref1. Moreover, the current flowing through the N-channel FET 13x6 is copied to a second current mirror circuit constituted by a pair of P-channel FETs 13x7 and 13x8 and to a third current mirror circuit constituted by a pair of N-channel FETs 13x9 and 13x10 and then output from the first current amplifier (ON time increasing circuit) 13x as a sink current i2.

In this way, the sink current i2 output when the OFF time detection voltage Voff is less than the first threshold voltage Vref1 is applied to the integrator of the ramp generator 13, where the current i2 is subtracted from the constant current i1 that is charging the capacitor 13g. As a result, when the OFF time Toff is less than a prescribed value, the capacitor 13g is charged more slowly by a current that is equal to the difference of the constant current i1 and the current i2 (i1−i2). This reduces the slope of the ramp voltage RAMP, thereby increasing the ON time Ton of the switching element 4, which is controlled by the charge voltage of the capacitor 13g.

Moreover, when the OFF time detection voltage Voff becomes greater than the first threshold voltage Vref1, the sink current i2 decreases rapidly and becomes substantially equal to zero once the difference between the OFF time detection voltage Voff and the first threshold voltage Vref1 exceeds the threshold voltage of the N-channel FETs 13x3 and 13x4. As a result, the capacitor 13g is charged at the prescribed constant current i1, and therefore the slope of the ramp voltage RAMP is not reduced. Therefore, if the OFF time Toff is greater than a prescribed threshold value defined by the first threshold voltage Vref1, the ON time Ton of the switching element 4 is not increased.

In other words, the ramp generator 13 that includes the first current amplifier (ON time increasing circuit) 13x which is configured as described above keeps the slope of the ramp voltage RAMP equal to a relatively low value if the OFF time Toff of the switching element 4 is less than a prescribed value. In this case, the error voltage Verr is maintained at a fixed value for the duration of one cycle of the input voltage Vin as obtained by rectifying the AC input voltage, and therefore the ON time Ton of the switching element 4 is increased by an amount corresponding to the slope of the ramp voltage RAMP (which is kept equal to a relatively low value).

In particular, the OFF time Toff of the switching element 4 tends to be less than the prescribed value in phase regions in which the phase angle of the input voltage Vin is low. Therefore, increasing the ON time Ton of the switching element 4 in these low phase angle regions allows more current to flow, thereby effectively preventing a decrease in the power factor.

The ramp generator 13 also includes the second current amplifier (ON time increase reduction circuit) 13y. The second current amplifier (ON time increase reduction circuit) 13y determines the bias current of the first current amplifier 13x and reduces the bias current of the first current amplifier 13x when the low input voltage Vin is a low voltage system in order to reduce the magnitude of the sink current i2 generated by the first current amplifier 13x.

More specifically, as illustrated in FIG. 5, for example, the second current amplifier (ON time increase reduction circuit) 13y includes a differential amplifier in which diode-connected N-channel FETs 13y3 and 13y4 function as loads and a pair of P-channel FETs 13y1 and 13y2 function as a differential pair. The error voltage Verr and the second threshold voltage Vref2 are respectively input to the gate terminals of the FETs 13y1 and 13y2. The second current amplifier 13y also includes a constant current source 13y7 that supplies a bias current to the differential amplifier.

In the differential amplifier, when the error voltage Verror is equal to the second threshold voltage Vref2, half of the bias current is passed through to the P-channel FETs 13y1 and 13y2 and half of the bias current is passed through to the N-channel FETs 13y3 and 13y4. When the error voltage Verr is less than the second threshold voltage Vref2 (that is, Verr<Vref2), the N-channel FET 13y3 receives more current.

Similarly, when the error voltage Verr is greater than the second threshold voltage Vref2 (that is, Verr>Vref2), the N-channel FET 13y4 receives more current. Moreover, the difference between the currents flowing through the N-channel FETs 13y3 and 13y4 increases as the difference between the error voltage Verr and the second threshold voltage Vref2 increases. Once the difference between the error voltage Verr and the second threshold voltage Vref2 exceeds a prescribed value (which is approximately equal to the threshold voltage of the P-channel FETs 13y1 and 13y2), current begins to flow to just one of the N-channel FETs 13y3 and 13y4 (the FET for which the applied voltage (Verr or Vref2) is lowest).

Furthermore, an N-channel FET 13y5 is connected to the output stage of the differential amplifier. Together, the N-channel FET 13y5 and the N-channel FET 13y3 form a fourth current mirror circuit. The amount of current that flows to the fourth current mirror circuit increases as the error voltage Verr becomes increasingly less than the second threshold voltage Vref2, and as the magnitude of this current increases, the amount of current flowing through the N-channel FET 13y5 decreases. Moreover, the current flowing through the N-channel FET 13y5 is copied to a fifth current mirror circuit constituted by a P-channel FET 13y6 of the second current amplifier (ON time increase reduction circuit) 13y and the P-channel FET 13x5 of the first current amplifier (ON time increasing circuit) 13x and then becomes the bias current of the first current amplifier (ON time increasing circuit) 13x.

In this way, the bias current output from the second current amplifier (ON time increase reduction circuit) 13y which then becomes the bias current of the differential amplifier of the first current amplifier (ON time increasing circuit) 13x is reduced when the low input voltage Vin is a low voltage system. This reduction in the bias current reduces the sink current i2 generated by the first current amplifier (ON time increasing circuit) 13x.

Therefore, when the input voltage Vin is a low voltage system and the error voltage Verr is greater than the second threshold voltage Vref2, the amount by which the charge current of the capacitor 13g of the ramp generator 13 is reduced at low phase angles of the input voltage Vin is kept equal to a relatively low value. In other words, the sink current i2 generated by the first current amplifier (ON time increasing circuit) 13x is reduced by an amount corresponding to the reduction in the bias current supplied to the first current amplifier (ON time increasing circuit) 13x by the second current amplifier (ON time increase reduction circuit) 13y.

As a result, the charge current of the capacitor 13g becomes greater than when the input voltage Vin is a high voltage system by an amount corresponding to the reduction in the sink current i2, thereby decreasing the reduction in the slope of the ramp voltage RAMP and reducing the amount by which the ON time Ton of the switching element 4 is increased. This makes it possible to reduce the increase in the ON time Ton to the minimum required value, thereby making it possible to make the switching power supply less prone to the effects of noise, prevent malfunctions due to the abovementioned hunting phenomenon or the like when the low input voltage is a low voltage system, and maintain stable operation of the switching power supply.

In other words, at least one aspect of the present invention has a simple configuration in which the second current amplifier (ON time increase reduction circuit) 13y is used to reduce the amount by which the ON time Ton is increased in a low voltage system. This makes is possible to achieve a variety of advantageous effects, such as preventing decreases in the power factor in the low phase angle regions while also being able to maintain stable operation when the high input voltage is a high voltage system.

It should be noted that the present invention is not limited to the embodiment described above. In the embodiment described above, the magnitude of the error voltage Verr is used to determine whether the input voltage Vin is a high voltage system or a low voltage system. However, the input voltage Vin may be divided and detected directly, and then the determination may be made according to the peak value, average value, or the like of the input voltage Vin, for example. Moreover, the amount by which the ON time Ton is increased in the low phase angle regions and the amount by which that increase is reduced when necessary may be determined according to the design specifications of the switching power supply.

Furthermore, in the embodiment described above, the magnitude of the current i2 that is subtracted from the charge current i1 supplied to the capacitor 13g is changed to reduce the slope of the ramp voltage RAMP, and the ON time Ton is corrected accordingly. However, a plurality of different constant current sources may be prepared in advance according to the expected values of the OFF time Toff, and the constant current sources may be used selectively according to the detected OFF time Toff to charge the capacitor 13g such that ramp voltages RAMP of different slopes are generated, for example. Furthermore, the switching power supply may be configured such that increases and corrections of the ON time Ton are entirely prohibited in the low phase angle regions of a low voltage system. In addition, various other modifications may be made without departing from the spirit of the present invention.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A switching power supply, comprising:
    a switching element that, when turned ON, forms a current path between terminals of an input power source through an inductance element;
    a voltage output circuit that, when the switching element is turned OFF, rectifies and smooths a current obtained from the inductance element in order to generate an output voltage;
    an error amplifier that generates an error voltage representing a difference between the output voltage and a prescribed target output voltage;
    a zero current detection circuit that determines that the current flowing through the inductance element has decreased to zero when the current flowing through the inductance element has decreased to less than a prescribed reference value;
    a ramp voltage generation circuit that starts generating a ramp voltage each time the switching element is turned ON;
    an ON/OFF control circuit that turns the switching element ON each time the zero current detection circuit detects zero current and subsequently turns the switching element OFF when the ramp voltage generated by the ramp voltage generation circuit exceeds the error voltage;
    an OFF time detection circuit that monitors an OFF time of the switching element;
    an ON time increasing circuit connected to the ramp voltage generation circuit, the ON time increasing circuit comparing the OFF time of the switching element as monitored by the OFF time detection circuit with a prescribed value and, when the OFF time of the switching element is less than said prescribed value, causing the ramp voltage generated by the ramp voltage generation circuit to change in such a way as to increase the ON time of the switching element; and an ON time increasing rate adjusting circuit that determines whether the input power source is a relatively low voltage system or a relatively high voltage system, and that reduces an amount by which the ON time of the switching element is increased by the ON time increasing circuit when the input power source is determined to be the relatively low voltage system.

2. The switching power supply according to claim 1, wherein the ON time increasing circuit increases the ON time of the switching element by reducing a slope of the ramp voltage.

3. The switching power supply according to claim 1, wherein the ON time increasing rate adjusting circuit reduces an amount by which a slope of the ramp voltage is decreased by the ON time increasing circuit.

4. The switching power supply according to claim 3, wherein the ON time increasing rate adjusting circuit determines whether the input power source is the relatively low voltage system based upon a magnitude of the error voltage.

5. The switching power supply according to claim 1,
wherein the ramp voltage generation circuit generates the ramp voltage by an integrator that integrates a first constant current and that is reset when the zero current detection circuit detects the zero current,
wherein the ON time increasing circuit is a first current amplifier that generates a second constant current when a signal voltage that represents the OFF time of the switching element is less than a prescribed threshold value and reduces a slope of the ramp voltage by subtracting the second constant current from the first constant current that is integrated by the integrator, and
wherein the ON time increasing rate adjusting circuit is a second current amplifier that decreases the second constant current by decreasing a gain of the first current amplifier when a voltage of the input power source is less than a prescribed voltage.

6. The switching power supply according to claim 5, wherein the ON time increasing rate adjusting circuit determines whether the input power source is the relatively low voltage system based upon a magnitude of the error voltage.

7. The switching power supply according to claim 5, further comprising:
a full-wave rectifier circuit to be connected to an AC input power source of a prescribed voltage so that an input voltage that has been full-wave rectified is applied to one end of the inductance element, and
wherein the inductance element, the switching element, and the voltage output circuit form a step-up inverter that generates a prescribed DC output voltage from the input voltage.

8. The switching power supply according to claim 7,
wherein the switching power supply is configured such that said AC input power source of the prescribed voltage to which said full-wave rectifier circuit is to be connected is either a 100V or 220V commercial AC power source, and
wherein the ON time increasing rate adjusting circuit determines that the commercial AC power source is the 100V power source when the error voltage is greater than a prescribed value and decreases the second constant current output by the ON time increasing circuit.

9. The switching power supply according to claim 1, wherein the ON time increasing rate adjusting circuit determines whether the input power source is the relatively low voltage system based upon a magnitude of the error voltage.

10. The switching power supply according to claim 1, further comprising:
a full-wave rectifier circuit to be connected to an AC input power source of a prescribed voltage so that an input voltage that has been full-wave rectified is applied to one end of the inductance element, and
wherein the inductance element, the switching element, and the voltage output circuit form a step-up inverter that generates a prescribed DC output voltage from the input voltage.

11. The switching power supply according to claim 10, wherein the switching power supply is configured such that said AC input power source of the prescribed voltage to which said full-wave rectifier circuit is to be connected is either a 100V or 220V commercial AC power source.

12. The switching power supply according to claim 1, wherein the OFF time detection circuit is reset when the switching element is turned OFF and then detects, as the OFF time of the switching element, a charge voltage of a capacitor charged by a constant current source until the switching element is turned back ON in a next cycle, and then that charge voltage is maintained while the switching element remains ON in that next cycle.

* * * * *